United States Patent
Vig et al.

(10) Patent No.: US 11,449,490 B1
(45) Date of Patent: Sep. 20, 2022

(54) IDEMPOTENT TRANSACTION REQUESTS

(71) Applicant: Amazon Technologies, Inc., Seattle, WA (US)

(72) Inventors: Akshat Vig, Seattle, WA (US); Stefano Stefani, Issaquah, WA (US); Somasundaram Perianayagam, Seattle, WA (US); Rishabh Jain, Seattle, WA (US); Nathan Pellegrom Riley, Seattle, WA (US); Jin Kyoung Kwon, Seattle, WA (US); Anshul Gupta, Seattle, WA (US); Alexander Richard Keyes, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 16/199,083

(22) Filed: Nov. 23, 2018

(51) Int. Cl.
*G06F 16/23* (2019.01)
*G06F 16/22* (2019.01)

(52) U.S. Cl.
CPC ...... *G06F 16/2365* (2019.01); *G06F 16/2282* (2019.01); *G06F 16/2343* (2019.01)

(58) Field of Classification Search
None
See application file for complete search history.

(56) References Cited

U.S. PATENT DOCUMENTS

| | | | | |
|---|---|---|---|---|
| 6,032,216 | A * | 2/2000 | Schmuck | G06F 16/1858 710/200 |
| 10,025,813 | B1 * | 7/2018 | Gebremariam | G06F 16/2365 |
| 10,031,948 | B1 * | 7/2018 | Kulshreshtha | G06F 16/128 |
| 2006/0253502 | A1 * | 11/2006 | Raman | G06F 16/2308 |
| 2009/0089338 | A1 * | 4/2009 | Ranade | G06F 16/23 |
| 2012/0330913 | A1 * | 12/2012 | Devadhar | G06F 16/2343 707/703 |
| 2014/0279987 | A1 * | 9/2014 | Chico de Guzman Huerta | G06F 16/176 707/704 |
| 2017/0123992 | A1 * | 5/2017 | Bradbury | G06F 16/38 |

* cited by examiner

*Primary Examiner* — Son T Hoang
(74) *Attorney, Agent, or Firm* — Davis Wright Tremaine LLP (57) ABSTRACT

A request to perform a batch of operations is provided to a distributed database. The request comprises instructions for validating a condition. An association between the request and a unique identifier is stored. An item in the distributed database is locked and the condition is validated. The system that initiates processing of the batch of operations. A second request, comprising the identifier, is received. The second request is responded to by providing information indicative of the status of processing the first request, based on the stored association. The lock is released when processing of the first request has completed.

20 Claims, 6 Drawing Sheets

IDEMPOTENT TRANSACTION REQUESTS

BACKGROUND

Database management systems provide a variety of mechanisms to help maintain data integrity. Among these mechanisms are transactions. In a database management system, a transaction can be described as one or more operations that are treated as an integral unit of work. Transactions, moreover, typically conform to the properties of atomicity, consistency, isolation, and durability. relational databases, in particular, provide extensive support for transactions conforming to these characteristics. However, support for transactions is not as well-developed in the field of distributed databases.

BRIEF DESCRIPTION OF THE DRAWINGS

Various techniques will be described with reference to the drawings, in which.

DETAILED DESCRIPTION

Described herein are techniques related to support for transactions in a distributed database. In an example embodiment, a distributed database system supports idempotent transaction requests. In general terms, an idempotent transaction request, as used herein, is one that may be submitted multiple times without changing the end state of the impacted data beyond the changes that would be caused by executing the request a single time. More formally, consider a transaction request $R_1(B_1,T_1) \Rightarrow S_1$. Here, $R_1$ is defined as a request to perform a batch of operations $B_1$, associated with token $T_1$, that when processed results in a data state $S_1$. The request is treated as idempotent because a request $R_2(B_1, T_1) \Rightarrow S_1$, as does $R_3(B_1, T_1) \Rightarrow S_1$, and so on. Here, $R_2(B_1,T_1)$ and $R_3(B_1, T_1)$ are subsequent requests to perform the same batch $B_1$ associated with the same token $T_1$. The execution of $R_1, R_2 \ldots R_n$ results in the same end-state $S_1$ as executing only $R_1$.

In an example embodiment, a distributed database system receives an initial request to perform a transaction. The request comprises one or more conditions to be checked during the prepare phase of the transaction, and one or more operations to be performed, on an atomic basis, in the context of the transaction. The request further comprises, or in the alternative is associated with, a token. The token is paired with the transaction request and is an aspect of the transaction request's idempotency. Thus, the transaction request $R_1$ and token $T_1$, when paired, are treated by the database management system as an idempotent unit.

The distributed database stores information associating the token with the transaction. The distributed database may also generate a transaction identifier based on the token, and use the transaction identifier to represent the idempotent transaction internally. From the outside perspective, however, the idempotent transaction is identified by $R_1$ and token $T_1$.

The distributed database executes the requested transaction in two phases. In the first phase, which may be referred to as a prepare phase, the distributed database locks relevant items in the database and evaluates the conditions provided with the request. Various levels of locking granularity may be employed, but in at least some embodiments the distributed database locks, at least, those rows or items relevant to the tested conditions. The conditions serve as instructions for validating the data state prior to the commit phase of the transaction, in order to determine whether or not the operations of the transaction can succeed. For example, the operations may rely on certain assumptions regarding the data state, and consequently the transaction would fail if these assumptions were to prove false.

If the conditions are successfully validated, the distributed database begins performing the operations that comprise the transaction. While this is ongoing, the distributed database may receive subsequent request to perform the requested transaction, paired with the same token. As noted, the pair $\{R_1, T_1\}$ is treated as idempotent, and the additional invocation of the request, when accompanied by the token, will not alter the final data state as compared to a single invocation. Note that the use of this semantic may simplify client-side code for submitting transaction requests, since it allows for a retry loop that is comparatively simple, in view of more conventional approaches.

The distributed database may react to the subsequent request by determining that the pair $\{R_1, T_1\}$ was already submitted and providing status information for to the request. This may involve a mapping or conversion from the token to a stored record of the transaction, which can include status information. For example, the transaction might still be underway, it might have completed successfully, or it might have ended in failure. This information can then be provided to the client.

When the transaction does complete processing—which may occur before or after any subsequent invocations of the idempotent request pair $\{R_1, T_1\}$—the distributed database releases the previously acquired locks and updates the status information associated with the request. Within, at least, a period of idempotency, subsequent invocations of the idempotent request pair $\{R_1, T_1\}$ will not re-execute the transaction, but rather provide an indication regarding whether or not the transaction has successfully executed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: embodiments may provide improved support for transactional operations on a key-value database. Embodiments may also provide a more convenient application programming interface for application programs which interface with a database, due to the use of a transaction semantic based on request idempotency, and other factors described herein.

Figure 1:
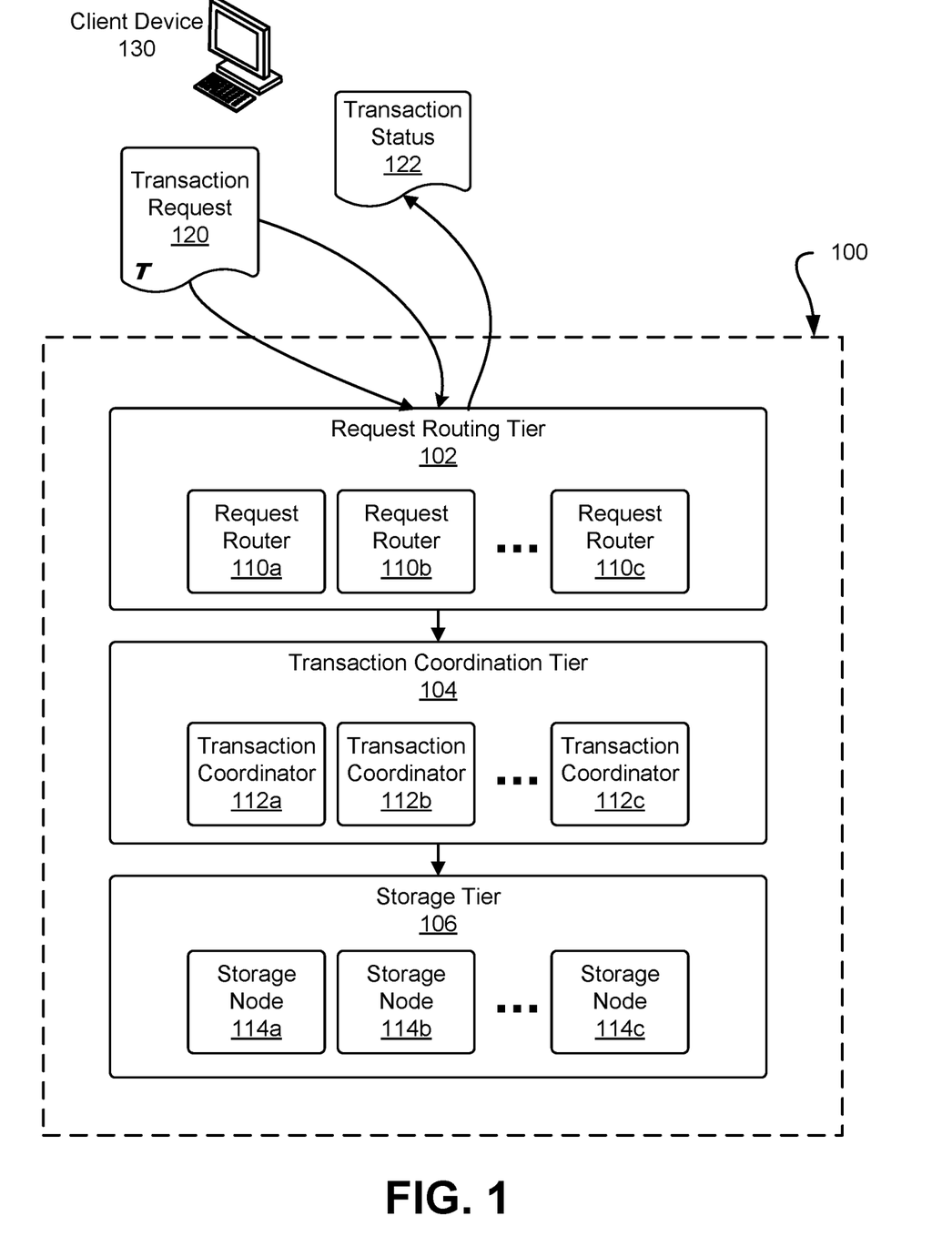
FIG. 1 illustrates a distributed database system supporting idempotent transaction requests, in accordance with an embodiment.

FIG. 1 illustrates a distributed database 100 supporting idempotent transaction requests, in accordance with an embodiment. A distributed database is a database management system in which the data managed by the system is distributed over a number of computing nodes. In the example embodiment depicted in FIG. 1, a distributed database 100 comprises a request routing tier 102, a transaction coordination tier 104, and a storage node tier 106.

The request routing tier 102 receive and perform initial and subsequent processing of requests received from a client device 130. The request routing tier 102 comprise a number of request routers 110a-c, among which the request routing workload is distributed.

Each of the request routers 110a-c comprises a module configured to perform the functions attributed herein to a request router. A module, as used herein, refers to processor-executable instructions stored in a non-transitory memory of a computing device. The instructions, when executed by at least one processor of the computing device, cause the computing device to perform at the functions of the module.

The request routers 110a-c may each be hosted on a compute node. A separate compute node may be used to host each request router, in order to scale capacity of the request routing tier 102. A compute node, as used herein, refers to a computing device, such as the application servers depicted in FIG. 6. The module may be installed so as to be operative on a virtual machine which executes, under the control of a hypervisor, on the compute node, or may be installed so as to be operative on the compute node itself. A compute node hosts a module by providing the computing environment in which the module executes. For example, a compute node may host a module by executing processor-executable instructions of which the module is comprised.

The transaction coordination tier 104 facilitates the processing of transactions. The transaction coordination tier 104 manages the execution of transactions, including the process of writing data to the storage nodes 114a-c, such that desired transaction properties are preserved. For example, the transaction coordinator may ensure that transactions conform to the properties of atomicity, consistency, isolation, and durability.

The transaction coordination tier 104 comprises a number of transaction coordinators 112a-c, among which the transaction coordination workload is distributed. Each of the transaction coordinators 112a-c may, for example, coordinate transactions for a given database table partitioned among a number of storage nodes 114a-c.

Each of the transaction coordinators 112a-c comprises a module configured to perform the functions attributed herein to a transaction coordinator. The transaction coordinators 112a-c may each be hosted on a separate compute node, in order to scale the capacity of the transaction coordination tier 104.

In an embodiment, the storage tier 106 comprises a number of storage nodes 114a-c. Each storage node 114a-c, which might be referred to individually as a partition, performs storage and retrieval operations on all or some of a database table.

In an embodiment, each storage node 114a-c is a module hosted on a compute node. Each storage node 114a-c further comprises one or more storage devices in communication with the compute node. Each one of the storage nodes 114a-c might store, on its respective storage devices, some or all of a database table. For example, each of the storage nodes 114a-c might store a partition of a horizontally partitioned database table.

A database table is a collection of data. A database table may comprise a collection of rows, sometimes referred to as items. A row, or item, is a collection of values. The table and rows may be structured, semi-structured, or unstructured. In one example, a "NoSQL" database stores and maintains tables, which might be referred to as collections of items, or might be described with other terminology. Each a table might correspond to a collection of rows, which may also be referred to as items, or might be described with other terminology. Each row consists of one or more values. In some cases, the distributed database may ensure that each item conforms to a schema or other criteria, but in other cases no such schema or criteria is enforced. In another example, a relational database stores and maintains one or more tables which conform to a defined schema. A schema might, for example, define the types and order of columns of the table. It will be appreciated that these examples are intended to be illustrative, and as such should not be construed so as to limit the scope of the present disclosure to embodiments which conform to the specific examples provided.

In an embodiment, a client device 130 submits a transaction request 120 to the distributed database 100. The transaction request 120 is associated with a unique identifier, which may also be referred to herein as a unique token, or simply as a token. In FIG. 1, a token "T" is included in the batch request.

The transaction request 120 comprises instructions for performing a plurality of operations on a database table. For example, the transaction request 120 might contain instructions to perform a plurality of various operations, such as "PUT," "GET," "WRITE," "READ," "UPDATE," "SELECT," or "INSERT" operations.

The distributed database 100 executes the batch request atomically. This refers to execution of the operations specified by the batch, such that either all of the intended operations are successfully performed, or none are. To support atomicity, the distributed database 100 might, for example, execute the operations using a two-phase protocol, in which the effects of the operations are prepared in a first phase and committed in the second.

The distributed database 100 treats the transaction request 120 as idempotent, based on the token "T" associated with the transaction request 120. As used herein, an idempotent request is one that may be submitted multiple times without changing the end state of the impacted data, beyond whatever changes to the end state that would be caused by executing the request a single time. Note, however, that idempotency of the request is, in various embodiments, dependent on a token or other unique identifier, and may expire after a period of time.

The distributed database 100, in an embodiment, responds to a subsequent submission of the transaction request 120 by providing a transaction status 122. The transaction status 122 can comprise information indicative of the state of the transaction, such as information indicating that the transaction is complete, that the transaction is still being processed, that the transaction failed validation during the prepare phase, that the transaction failed for some other reason, that the transaction was cancelled prior to completion, and so on. In some cases and embodiments, information usable to diagnose the source of a failure or submit a new, corrected transaction might be also be supplied with the transaction status 122.

Figure 2:
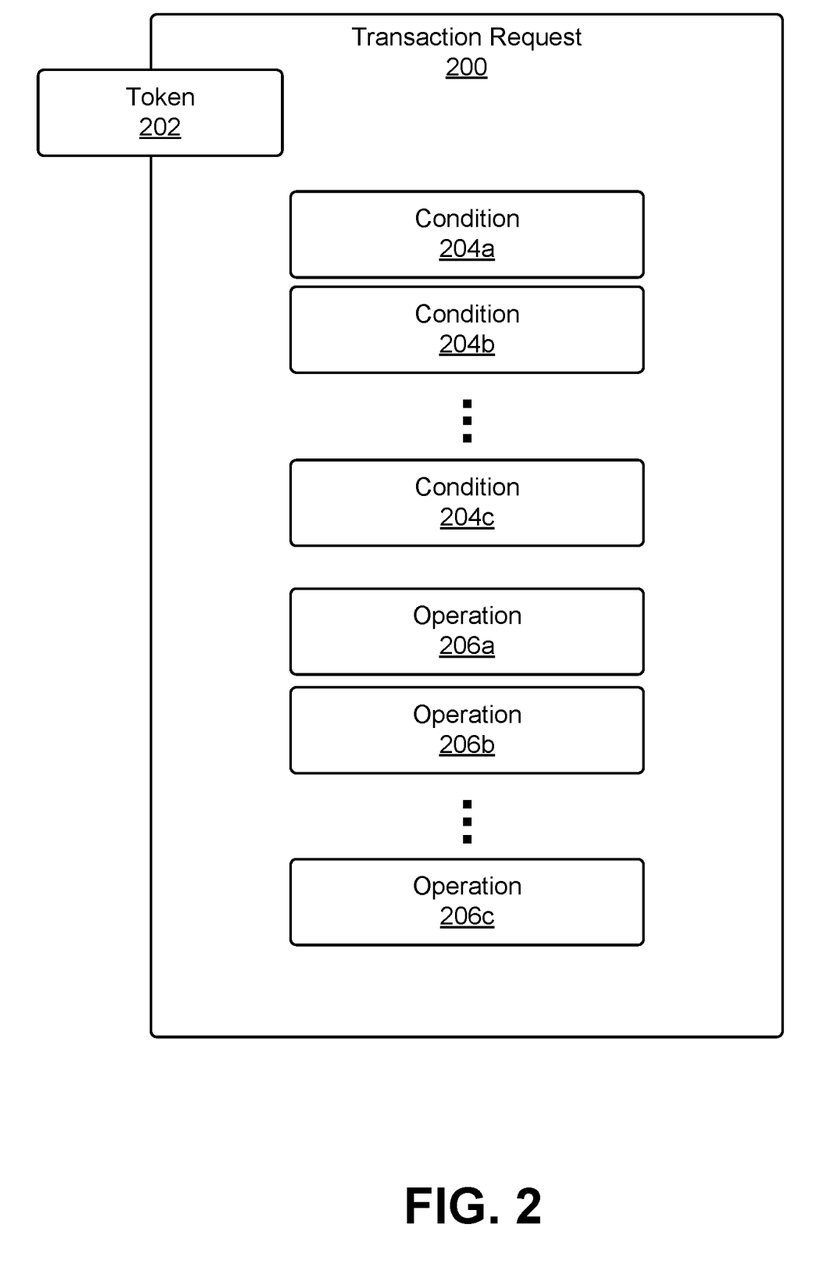
FIG. 2 illustrates a transaction request, in accordance with an embodiment.

FIG. 2 illustrates a transaction request, in accordance with an embodiment. A transaction request 200 comprises one or more conditions 204a-c and one or more operations 206a-c. A transaction request 200 is also associated with a token 202, and in some embodiments the transaction request 200 comprises the token 202.

The token 202 may correspond to a numeric or alphanumeric value or string. In an embodiment, the token 202 is a unique identifier, although in this context the term unique does not necessarily imply that the token is globally unique. For example, given that idempotency of a request may be limited by time, it may be sufficient for an identifier to be non-repeating within the specified time period.

More generally, the token 202 may be data which, either alone or in combination with its corresponding transaction request, is sufficient to uniquely identify the transaction request for the desired period of idempotency.

In an embodiment, the transaction request 200 is specified using a textual representation. For example, a scripting language, extended markup language ("XML"), structured query language ("SQL"), or other text-based representation may be used. In some embodiments, the transaction request 200 is represented textually in two sections, one describing the conditions 204a-c and the other describing the operations 206a-c.

In an embodiment, the transaction request 200 is specified programmatically, via an application programming interface ("API"). For example, API functions might be provided to specify a list of conditions and a list of operations, and to submit a completed transaction request 200 to a distributed database.

The conditions 204a-c of the transaction request 200 describe one or more conditions that are used during the prepare phase of transaction processing to determine whether or not the commit phase may be entered. For example, if the transaction request 200 describes an operation to transfer an account balance between two accounts, the condition might ensure that the source account has a sufficient balance and that the destination account exists and is able to receive the transferred amount.

The operations 206a-c of the transaction request 200 describe one or more operations to perform, provided that the conditions 204a-c are successfully validated. Continuing the previous example, once the conditions have been validated, a first operation 206a might be executed to deduct the amount from the source account, and a second operation 206b executed to add the amount to the destination account.

In more general terms, a transaction request $R_1$ may be defined as comprising a condition set $\{C_1, C_2, \ldots C_n\}$ and an operation set $\{O_1, O_2, \ldots O_n\}$. In cases and embodiments, the condition set $\{C_1, C_2, \ldots C_n\}$, if validated against a dataset $D_1$, provides a partial guarantee that the operation set $\{O_1, O_2, \ldots O_n\}$ can be successfully applied to $D_1$.

Figure 3:
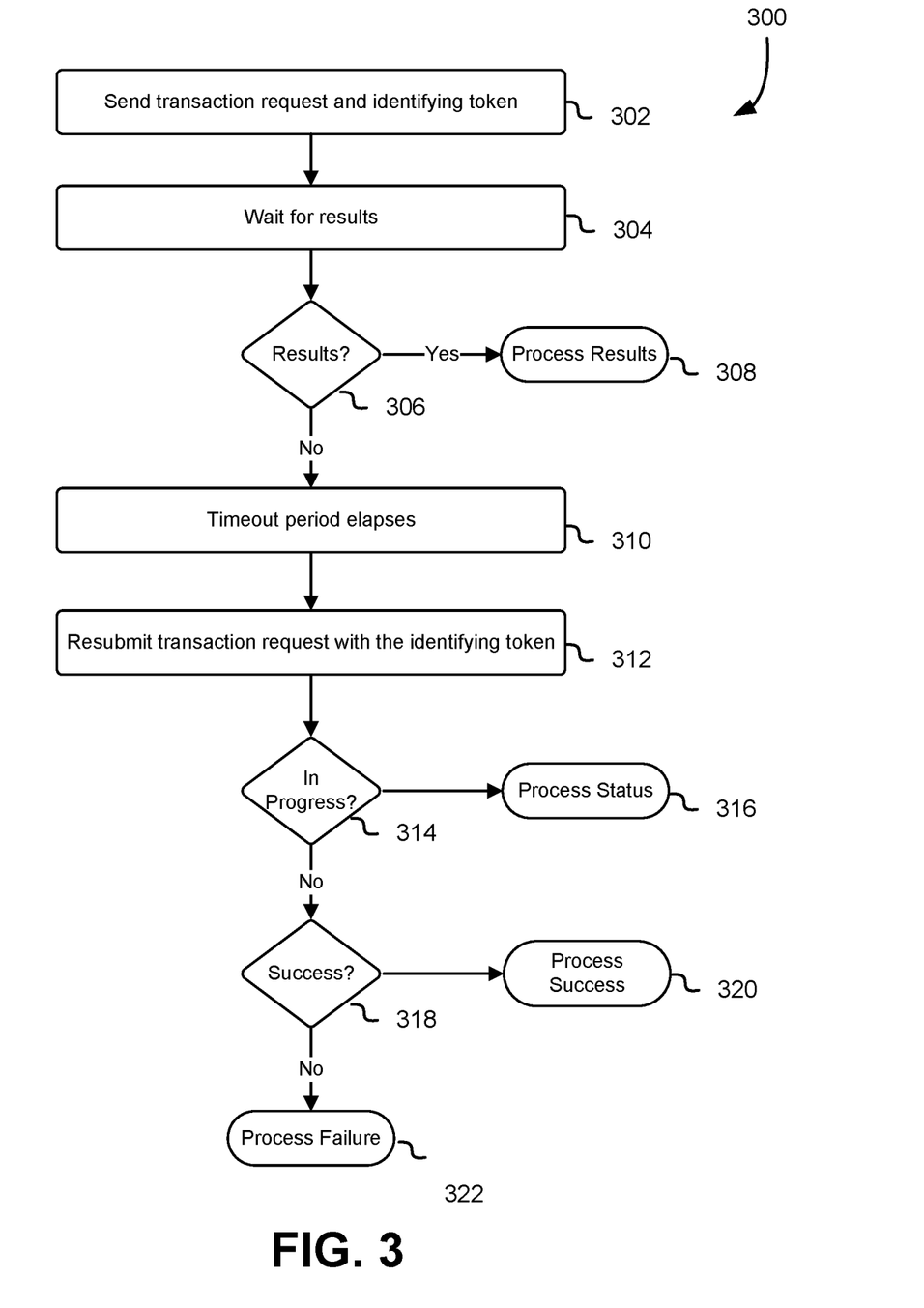
FIG. 3 is a flowchart depicting client processing of an idempotent transaction request, in accordance with an embodiment.

FIG. 3 is a flowchart depicting client processing of an idempotent transaction request, in accordance with an embodiment. Although FIG. 3 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The steps of the example process 300 may be performed, except where indicated, by a client device, such as the client device 130 depicted in FIG. 1. The following description may, however, reference various related operations as performed by a distributed database, such as the distributed database 100 depicted in FIG. 1.

Step 302 depicts the client sending a transaction request with an identifying token. The client may obtain the token from a variety of sources or techniques. In some instances, a token might be obtained from data. For example, a customer identification number might be used for a transaction request intended to update a customer record. In some instances, a function generating a pseudo-random alphanumeric string might be used.

In some embodiments, the client omits the identifying token, and is instead provided with it after submitting the transaction request for the first time. The token is then submitted with any subsequent requests to perform or retrieve status for the same transaction. There may, for example, be an API with which the client device interacts to perform various functions of the database. The API might be provided as a client-side call-level interface, as a web service, or as some combination thereof, in various embodiments.

After sending the transaction request, the client device may wait for the transaction to complete. Step 304 depicts waiting for results of the transaction request to be made available. Typically, application programs executing on the client device are configured to have a timeout period, although this is not required. For application programs that do implement a timeout-period, step 306 depicts determining whether or not results of the transaction request are available prior to the elapsing of the timeout period.

In various embodiments, the results are provided via a polling API or a callback mechanism. If results are available prior to expiration of the timeout period, the example process 300 of FIG. 3 continues to step 308, which depicts processing the results of the transaction. The request may have failed, in which case the client device receives, in various embodiments, information describing the failure. For example, the client device may receive an indication of any conditions that may have failed during the prepare stage, or information describing another source of failure. If the request succeeded, the client device may receive information pertaining to or provided by the successful processing of the transaction. This information may be referred to herein as the "extended results" of the transaction, and refers to information derived from the data impacted by the transaction. For example, a transaction request might indicate that certain information, such as a copy of an updated record, be returned to the initiating client device upon the successful completion of the transaction. To further illustrate this concept, a transaction request might conclude with a "SELECT" or "GET" operation intended to retrieve data indicative of the data state as of the successful completion of the transaction.

In various embodiments, this information is provided when the transaction successfully completes before the termination of the initial timeout period, or only when otherwise retrieved based on the initial submission of the transaction request. As explained in more detail below, embodiments may preclude providing the extended results of the transaction—such as the aforementioned copy of an updated record—unless it can be provided to the client device within some threshold period of time from the successful completion of the transaction.

If results are not available, and the timeout period has elapsed as indicated by step 310, the process may continue to step 312. Step 312 depicts the client resubmits the transaction request, with the identifying token.

As indicated by step 314, the request may still be in progress when the transaction request is resubmitted. If so, the client device is provided with and may process the current status of the transaction request, as indicated by step 316. The information returned to the client might simply indicate that the transaction is pending, or in various embodiments might include further information, such as a progress indicator.

When the transaction request is resubmitted, it might also be the case that the transaction has already completed, in success or failure. As indicated by step 318, the process then continues to either step 320, where a success status is processed, or step 322, where a failure status is processed.

If the transaction is successfully completed, the client device may receive an indication of successful completion of the transaction, as depicted by step 320. The client device is provided with information indicating that the requested transaction has been successfully completed. In an embodiment, the client is provided an indication of when the transaction completed. It may be the case that the request completes within a threshold amount of time (e.g., the aforementioned timeout period) of resubmitting the request. In this case, the information might include the extended results of a transaction, such as the results of a "SELECT" or "GET" operation, which embodiments might preclude to provide to the client device after the threshold period of time has elapsed. Note that if too much time elapses between the completion of the transaction and the client device's receipt of such information, the information may be out-of-date when it is received. Accordingly, in various embodiments, if the transaction has already successfully completed when the request has been submitted, the information provided to the client device may include status information, but exclude result information. However, some embodiments may include extended results, even when the request has completed well before the resubmission of the transaction request.

If the transaction ended in failure, the client device may receive an indication of the failure of the transaction, as depicted by step 322. Here too, the amount of information provided may be dependent on when the transaction completed. Embodiments may retain extended results or more detailed error information for a period of time, such as the aforementioned timeout period, before such results are no longer sent. This type of information might be retained for a longer period than for successful completions of a transaction. In any event, as depicted by step 322, the client device receives at least some information indicating that the transaction has failed.

Figure 4:
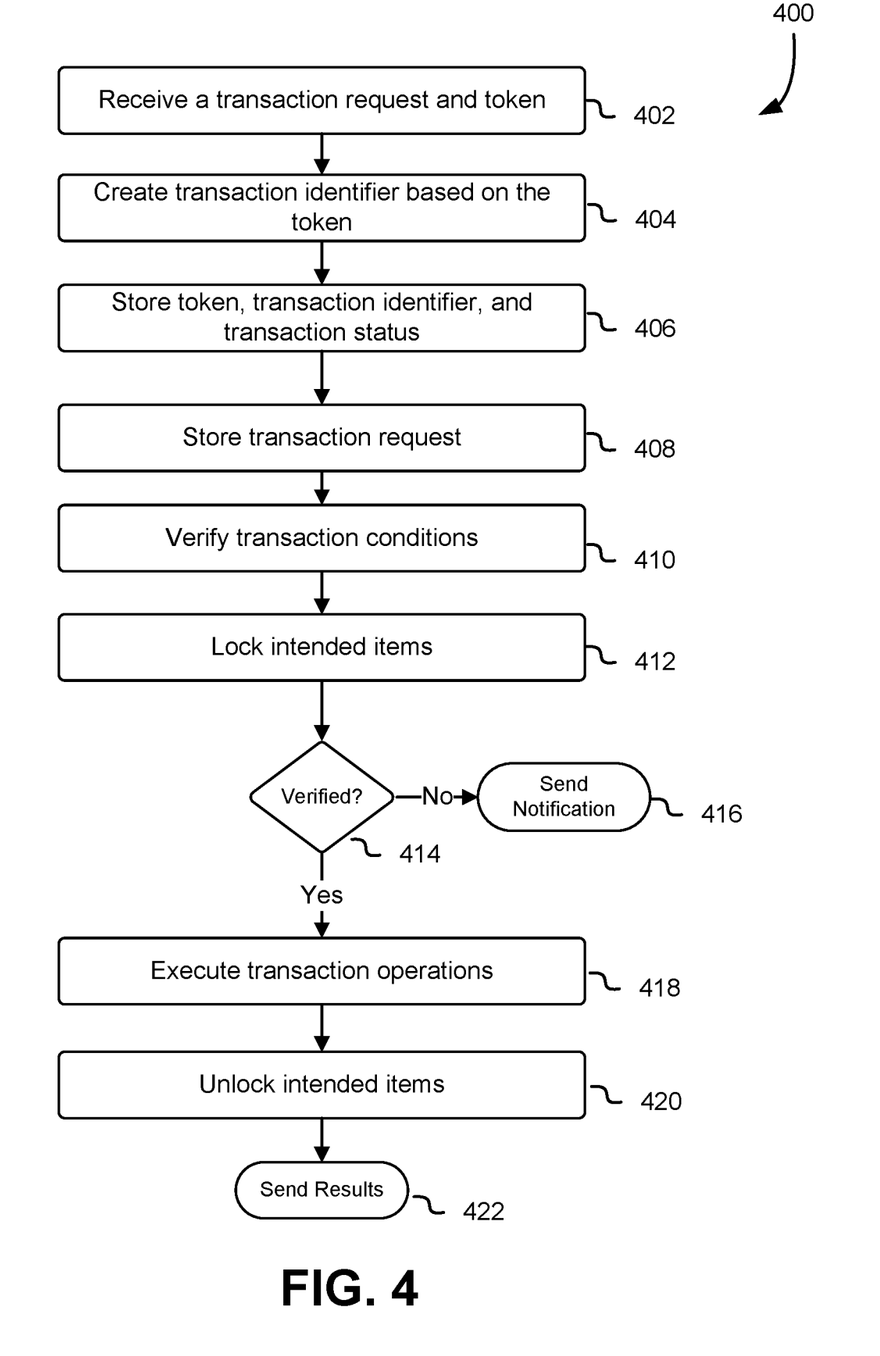
FIG. 4 is a flowchart depicting an example of a distributed database processing an idempotent transaction request, in accordance with an embodiment.

FIG. 4 is a flowchart depicting an example of a distributed database processing an idempotent transaction request, in accordance with an embodiment. Although FIG. 4 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 400 of FIG. 4 may be performed by a distributed database, such as the distributed database 100 that FIG. 1 depicts. In the following description of the example process 400, certain elements of the distributed database are described as performing various functions. However, it will be appreciated that in other embodiments, other elements of a distributed database may be adapted to perform the described functions.

Step 402 depicts receiving a transaction request and a token. The request is received, in an embodiment, by a request router, such as one of the request routers that FIG. 1 depicts. The distributed data then creates a transaction identifier based at least in part on the provided token, as depicted by step 404. The transaction identifier may be used internally by the distributed database to store and retrieve data pertinent to the transaction. The use of a transaction identifier, rather than the provided token, for internally representing the transaction allows for more flexibility regarding the content and format of the provided token. For example, the token can be based on data that logically relates to the application program that is consuming or providing the underlying data, or is otherwise convenient for the application, while the distributed database uses a transaction identifier that is more suitable its internal processing of the transaction. In an embodiment, a cryptographic or hashing algorithm is used to generate the transaction identifier. Examples include the MD5 message-digest algorithm, although it will be appreciated that this example is intended to be illustrative, and as such should not be construed so as to limit the scope of the intended disclosure to only those embodiments which include the provided examples. Steps 402 and 404 are performed, in some embodiments, by a request router.

As noted, the transaction identifier is based at least in part on the provided token. For example, the transaction identifier may be derived from a hash of the token. The identifier might also be based, in part, on other data such as a hash of the transaction request data, a session identifier, a client identifier, and so forth. The use of the provided token, and the other data if applicable, allows the transaction identifier to be recreated when the transaction request is submitted again.

Step 406 depicts the distributed database storing a record of the token, the transaction identifier, and status information. This step is perform, in some embodiments, by a request router. The distributed database may maintain a table in which this information is stored. As depicted by step 408, a copy of the transaction request may also be stored, in the same table or in another table. In an embodiment, the token, transaction identifier, and status information is stored in a table indexed by the token, and the transaction request is stored in another table indexed by the transaction identifier.

Step 410 depicts verifying the transaction request's conditions. As described in FIG. 2, a transaction request can contain one or more conditions, i.e., instructions for validating criteria. In an embodiment, a transaction coordinator, such as the transaction coordinators depicted in FIG. 1, perform a prepare phase of the transaction by executing the conditions provided by the request. This may typically involve interfacing with one or more storage nodes to retrieve and test the relevant data. For example, depending on the specified conditions, the transaction coordinator might determine whether certain rows exist, whether certain values fall within a specified range, and so forth.

Step 412 depicts locking intended items in order to enter the terminating step in the prepare phase of the transaction, in which the validity of the transaction is verified at least by checking the provided conditions. Here, intended items refers to rows, columns, or other data, where the row, column or data is expected to be affected by or involved in the processing of a transaction. In some embodiments, any rows or other data involved in the condition validation are considered intended items, and are locked. Alternatively, or in addition, any rows or other data to be involved in processing the transaction's operations are locked. For example, any rows specified by a "PUT" operation may be locked.

Step 414 depicts determining whether the conditions were verified. If the conditions failed verification, the example process 400 goes to step 416, in which the data is unlocked and a notification of the failed validation is sent to the client device. In an embodiment, the notification comprises and indication that the prepare phase of the transaction failed. In some cases and embodiments, additional information, such as information indicating which condition failed, is also provided.

Step 418 depicts executing the transaction operations. As depicted in FIG. 2, a transaction request may comprise a number of operations, each of which is to be executed as an atomic unit. In other words, all of the operations are to be successfully performed, or none of the operations will have any persistent effect on the data state.

Step 420 depicts unlocking the intended items, once all of the operations have completed execution and there effects committed to the database. Then, as depicted by step 422, the distributed database sends the results of the transaction to the client device. Further aspects of providing notifications are described in FIG. 5.

Figure 5:
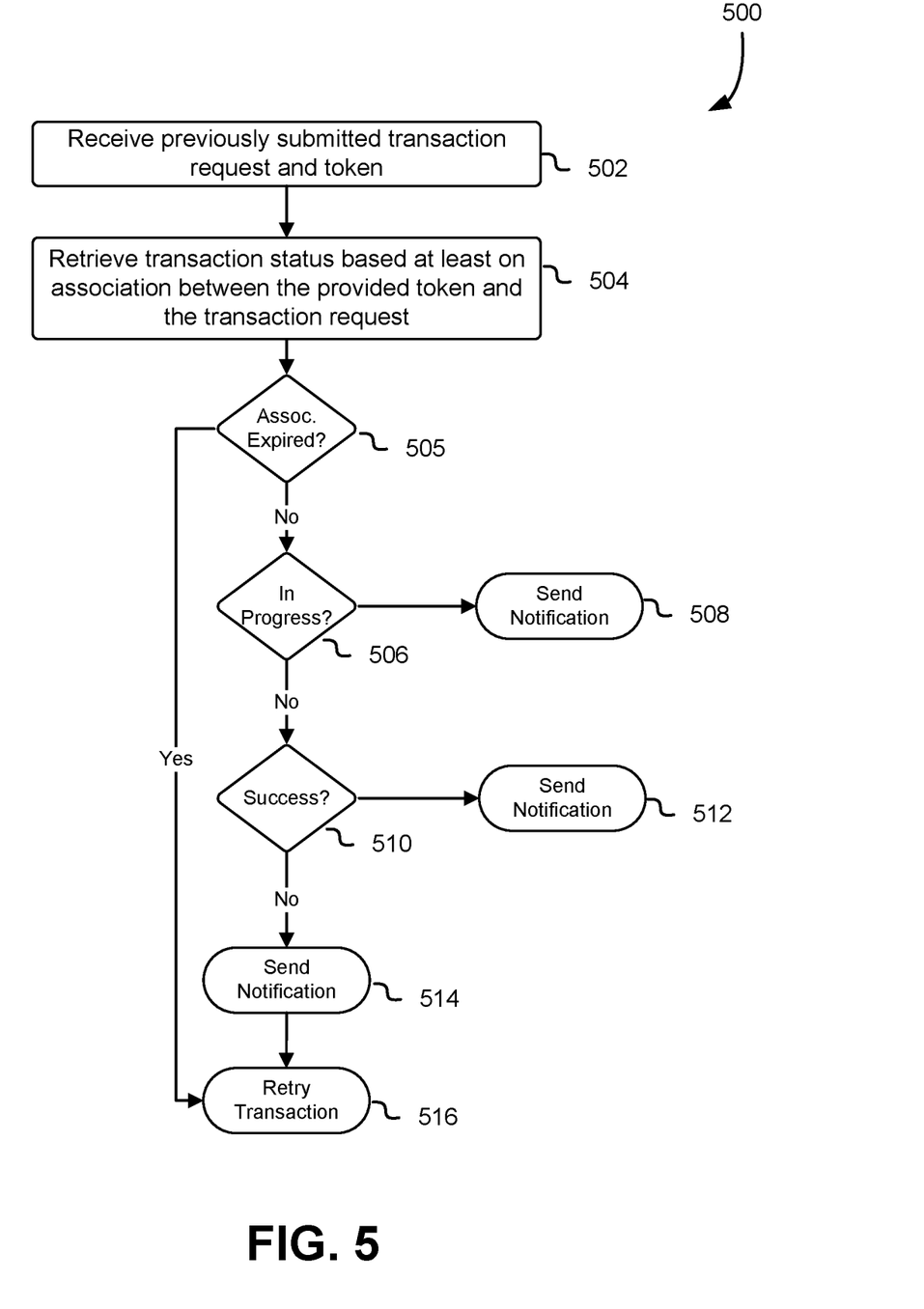
FIG. 5 is a flowchart depicting further aspects of an example of a distributed database processing an idempotent transaction request, in accordance with an embodiment.

FIG. 5 is a flowchart depicting further aspects of an example of a distributed database processing an idempotent transaction request, in accordance with an embodiment. Although FIG. 4 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 500 of FIG. 5 may be performed by a distributed database, such as the distributed database 100 that FIG. 1 depicts. In the following description of the example process 400, certain elements of the distributed database are described as performing various functions. However, it will be appreciated that in other embodiments, other elements of a distributed database may be adapted to perform the described functions.

Step 502 depicts the distributed database receiving a previously submitted transaction request and token, where the token is the same token provided originally.

Step 504 depicts the distributed database table retrieving status information for the transaction, based on a stored association between the provided token and the transaction request.

Step 505 depicts determining whether the association between the provided token and transaction request has expired. Embodiments may maintain the association for some threshold amount of time, after which the idempotency of the request is no longer maintained, and the association deleted from storage or marked as expired. If the association has expired, the example process may proceed to step 516. Otherwise, if the association remains in place, the example process proceeds to step 506.

Step 506 depicts the distributed database determining, based on the retrieved status information, whether or not the transaction is still in progress. If so, the example process 500 proceeds to step 508. As depicted by step 508, the distributed database may then send, to the client device, a notification of the pending status.

If the transaction has finished, the example process proceeds to step 510, in which the distributed database determines whether or not the transaction succeeded. If so, the example process 500 proceeds to step 512, in which the distributed database sends a notification of the successful completion of the transaction to the client device.

If the transaction did not complete successfully, the example process proceeds to step 514, in which the distributed database sends a notification of the transaction's failure to the client device.

In embodiments, step 516 is performed instead of or in addition to step 514. Step 516 may also be performed when a previously submitted transaction request has been submitted but the stored association between the transaction request and the provided token has expired. Step 516 depicts the distributed database retrying the transaction. In cases and embodiments, this occurs after the request has failed—the system might, for example, be configured to automatically retry the transaction and renew its lease on idempotency. Alternatively, if the transaction request is submitted again its period of idempotency has expired, it can be retried. This approach may provide for an improved programming paradigm.

Consider, for example, a "while" loop in which the transaction request is repeatedly submitted until an indication of success is indicated. Based on the processing described by FIG. 5, the while loop can be executed without altering the end state, since the request is treated as idempotent. An exception to this occurs if the association has expired, since the request is re-executed at step 516. However, this behavior may be advantageous in some circumstances, since it allows the same transaction to be re-executed periodically, provided the period is longer than the length of time the transaction request is treated as idempotent.

Figure 6:
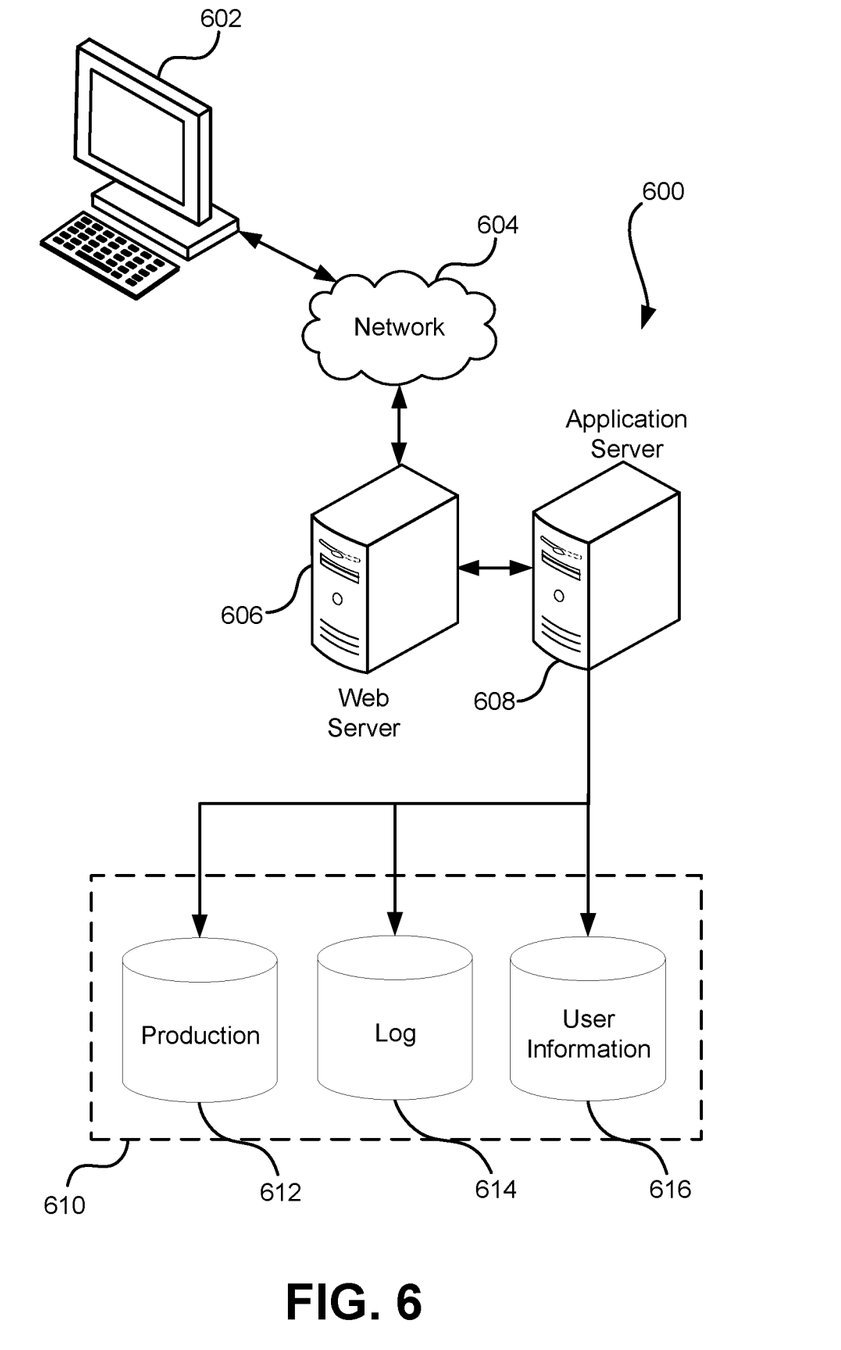
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory comprising processor-executable instructions that, in response to being executed by the at least one processor, cause the system at least to:
   receive a first request to perform a transaction comprising a plurality of operations on a database table of a database, the request comprising instructions for validating a condition associated with processing the plurality of operations;
   store information associating a token with the transaction;
   lock at least one item stored in the database table;
   validate the condition based at least in part on the instructions;
   perform the plurality of operations based at least in part on validation of the condition;
   receive a second request to perform the transaction, the second request comprising the token;
   respond to the second request to perform the transaction by providing information indicative of a status of ongoing processing of the first request to perform the transaction, the status determined based at least in part on the stored association between the transaction and the token; and
   unlock the at least one item in response to completing the processing of the first request.

2. The system of claim 1, wherein the first request comprises a unique identifier.

3. The system of claim 2, wherein the at least one memory comprises further processor-executable instructions that, in response to being executed by the at least one processor, cause the system at least to:
   delete the information associating the unique identifier with the plurality of operations, based at least in part on completing the processing of the first request and the passing of a period of time.

4. The system of claim 1, wherein the condition comprises comparing a value of a row of the database to a range of permissible values.

5. The system of claim 1, wherein the at least one memory comprises further processor-executable instructions that, in response to being executed by the at least one processor, cause the system at least to:
   provide, in response to completing the processing of the first request, information indicative of an updated state of at least one row of the database table.

6. A computer-implemented method, comprising:
   receiving a first request to perform a plurality of operations on a database table, the request comprising instructions for validating a condition;
   storing information associating a unique identifier with the plurality of operations;
   locking at least one item stored in the database table;
   performing the plurality of operations in response to validating the condition;
   receiving a second request to perform the same plurality of operations, the second request comprising the unique identifier;
   responding to the second request to perform the same plurality of operations, while the first request is ongoing, by providing information indicative of the status of processing the first request, the status determined based at least in part on the stored association between the request and the unique identifier; and
   unlocking the at least one item in response to completing the processing of the first request.

7. The computer-implemented method of claim 6, further comprising processing the plurality of operations as an atomic unit.

8. The computer-implemented method of claim 6, wherein the information indicative of the status of processing the first request comprises one or more results of processing the plurality of operations.

9. The computer-implemented method of claim 6, wherein the at least one item is selected for locking based at least in part on at least one of the condition or the plurality of operations.

10. The computer-implemented method of claim 6, wherein the first request comprises the unique identifier.

11. The computer-implemented method of claim 6, further comprising deleting the information associating the unique identifier with the plurality of operations, based at least in part on completing the processing of the first request and the passing of a period of time.

12. The computer-implemented method of claim 6, further comprising:
    receiving a third request to perform the plurality of operations; and
    performing the plurality of operations in response to the third request, based at least in part on the end of a period of idempotency of the first request.

13. The computer-implemented method of claim 6, wherein the second request is a copy of the first request and comprises the unique identifier.

14. A non-transitory computer-readable storage medium having stored thereon executable instructions that, as a result of being executed by one or more processors of a computer system, cause the computer system to at least:
    receive a first request to perform a plurality of operations on a database table, the request comprising instructions for validating a condition;
    store an association between a unique identifier and the plurality of operations;
    lock at least one item stored in the database table;
    perform the plurality of operations on the database table in response to validating the condition;
    receive a second request to perform the same plurality of operations, the second request comprising the unique identifier;
    respond to the second request to perform the same plurality of operations by providing information, while the first request is ongoing, indicative of the status of processing the first request, the status determined based at least in part on the stored association between the request and the unique identifier; and
    unlock the at least one item in response to completing the processing of the first request.

15. The non-transitory computer-readable storage medium of claim 14, wherein the information indicative of the status of processing the first request comprises one or more results of processing the plurality of operations.

16. The non-transitory computer-readable storage medium of claim 14, wherein the at least one item is selected for locking based at least in part on the condition.

17. The non-transitory computer-readable storage medium of claim 14, wherein the first request comprises the unique identifier.

18. The non-transitory computer-readable storage medium of claim 14, wherein the instructions further comprise instructions that, as a result of being executed by the one or more processors, cause the computer system to delete the information associating the unique identifier with the plurality of operations, based at least in part on completing the processing of the first request and the passing of a period of time.

19. The non-transitory computer-readable storage medium of claim 14, wherein the condition comprises comparing a value of a row of the database table to a range of permissible values.

20. The non-transitory computer-readable storage medium of claim 14, wherein the instructions further comprise instructions that, as a result of being executed by the one or more processors, cause the computer system to provide, in response to completing the processing of the first request, information indicative of an updated state of at least one row of the database table.

* * * * *